United States Patent
Mochizuki

(10) Patent No.: US 8,761,704 B2
(45) Date of Patent: Jun. 24, 2014

(54) RECEIVER OF CARRIER SENSE MULTIPLEXING CONNECTION METHOD AND INTERFERENCE SUPPRESSING METHOD THEREOF

(75) Inventor: Takuji Mochizuki, Tokyo (JP)

(73) Assignee: NEC Corporation, Tokyo (JP)

( * ) Notice: Subject to any disclaimer, the term of this patent is extended or adjusted under 35 U.S.C. 154(b) by 299 days.

(21) Appl. No.: 10/515,726

(22) PCT Filed: May 26, 2003

(86) PCT No.: PCT/JP03/06527
§ 371 (c)(1),
(2), (4) Date: Jun. 20, 2005

(87) PCT Pub. No.: WO03/103168
PCT Pub. Date: Dec. 11, 2003

(65) Prior Publication Data
US 2006/0154628 A1 Jul. 13, 2006

(30) Foreign Application Priority Data
May 27, 2002 (JP) .................................. 2002-152825

(51) Int. Cl.
*H04B 1/06* (2006.01)
*H04B 7/00* (2006.01)
(52) U.S. Cl.
USPC ........ 455/266; 455/226.2; 455/254; 455/134; 455/307
(58) Field of Classification Search
USPC ........................... 370/445; 375/285, 346–350; 455/134–135, 226.1–226.4, 230, 455/296–312, 254, 266
See application file for complete search history.

(56) References Cited

U.S. PATENT DOCUMENTS

| | | | |
|---|---|---|---|
| 4,352,208 A * | 9/1982 | Schroeder | 455/266 |
| 4,907,293 A | 3/1990 | Ueno | |
| 4,910,794 A | 3/1990 | Mahany | |
| 5,220,687 A * | 6/1993 | Ichikawa et al. | 455/254 |

(Continued)

FOREIGN PATENT DOCUMENTS

| | | |
|---|---|---|
| EP | 0865165 | 9/1998 |
| JP | 4-286228 | 10/1992 |
| JP | 9-261188 | 10/1997 |
| JP | 11-355169 | 12/1999 |

OTHER PUBLICATIONS

Supplementary European Search Report dated Apr. 13, 2011 in corresponding European Application No. 03733059.4.

*Primary Examiner* — Edward Urban
*Assistant Examiner* — Rui Hu
(74) *Attorney, Agent, or Firm* — Young & Thompson

(57) ABSTRACT

A broad band packet radio communication system is characterized by the carrier sense multiplexing connection method operated on a harsh frequency arrangement where an occupied band width of a modulation transmission/reception wave and a modulation side lobe are wide and the frequency channel interval is narrow. It is possible to improve the reception adjacent channel interference characteristic among a plurality of terminals belonging to the respective cells existing in the vicinity of adjacent frequency cell boundary area. The RSSI system is subjected to a narrow-band channel filtering (a narrow-band filter (BPF or LPF) having a band narrower than one-channel occupied band width) while the reception/demodulation system is subjected to a wide-band channel filtering (a wide-band filter (BPF or LPF) having a pass band equal to or wider than the one-channel occupied band width).

19 Claims, 9 Drawing Sheets

(56) References Cited

U.S. PATENT DOCUMENTS

| | | | |
|---|---|---|---|
| 5,287,556 A * | 2/1994 | Cahill | 455/266 |
| 5,303,413 A * | 4/1994 | Braegas | 455/266 |
| 5,307,372 A * | 4/1994 | Sawyer et al. | 375/133 |
| 5,483,694 A * | 1/1996 | Bartels et al. | 455/295 |
| 5,511,235 A * | 4/1996 | Duong et al. | 455/75 |
| 5,630,219 A * | 5/1997 | Matsuki et al. | 455/226.2 |
| 5,630,220 A * | 5/1997 | Yano | 455/234.1 |
| 5,657,326 A * | 8/1997 | Burns et al. | 370/349 |
| 5,745,856 A * | 4/1998 | Dent | 455/552.1 |
| 5,898,733 A * | 4/1999 | Satyanarayana | 375/133 |
| 5,923,454 A * | 7/1999 | Eastmond et al. | 398/202 |
| 5,940,400 A * | 8/1999 | Eastmond et al. | 370/445 |
| 5,970,105 A * | 10/1999 | Dacus | 375/344 |
| 5,974,098 A * | 10/1999 | Tsuda | 375/340 |
| 5,974,101 A * | 10/1999 | Nago | 375/350 |
| 6,058,148 A * | 5/2000 | Whikehart et al. | 375/350 |
| 6,070,062 A * | 5/2000 | Yoshida et al. | 455/234.1 |
| 6,111,911 A * | 8/2000 | Sanderford et al. | 375/147 |
| 6,115,593 A * | 9/2000 | Alinikula et al. | 455/324 |
| 6,122,327 A * | 9/2000 | Watanabe et al. | 375/316 |
| 6,178,211 B1 * | 1/2001 | Whikehart et al. | 375/350 |
| 6,178,314 B1 * | 1/2001 | Whikehart et al. | 455/188.1 |
| 6,335,953 B1 * | 1/2002 | Sanderford et al. | 375/344 |
| 6,697,415 B1 * | 2/2004 | Mahany | 375/130 |
| 6,816,715 B1 * | 11/2004 | Mano | 455/161.3 |
| 7,130,287 B2 * | 10/2006 | Nounin et al. | 370/332 |
| 7,149,488 B2 * | 12/2006 | Khorram | 455/266 |
| 7,151,759 B1 * | 12/2006 | Ryan et al. | 370/332 |
| 2003/0081706 A1 * | 5/2003 | Ciccarelli et al. | 375/350 |
| 2003/0100279 A1 * | 5/2003 | Medvid et al. | 455/164.2 |
| 2004/0023629 A1 * | 2/2004 | Klank | 455/130 |
| 2007/0066259 A1 * | 3/2007 | Ryan et al. | 455/234.1 |

* cited by examiner

RECEIVER OF CARRIER SENSE MULTIPLEXING CONNECTION METHOD AND INTERFERENCE SUPPRESSING METHOD THEREOF

TECHNICAL FIELD

The present invention relates to a receiver using the carrier sense multiple access method and interference suppression method thereof, and more particularly, to a receiver that can improve the adjacent channel interference characteristic among a plurality of base stations and terminals and interference suppression method thereof.

BACKGROUND ART

In order to design/configure a broadband packet radio communication system characterized by the carrier sense multiple access method such as an IEEE802.11a wireless LAN, it is especially important to design the arrangement of stations in such a manner as to enhance the entire capacity as well as ensuring stable throughput over broad areas.

In such station arrangement design, a repeat design for cells with a plurality of frequency channels in a multi-cluster structure is carried out by arranging the cells efficiently with consideration given to the same channel interference, etc. so that radio zones are sequentially extended.

When this method is applied to make the best use of available frequency bands designated by each country, it is not possible to avoid the arrangement of cells in frequency-position relation where two neighboring cells use adjacent frequency channels or next adjacent frequency channels depending on the cell repeat placement.

FIG. 1 is a diagram showing the configuration of the entire system for explaining problems involved in such frequency relation between cells. As can be seen in FIG. 1, a local channel base station (AP: Access Point) 22 secures as a local channel cell a service area 20, while an adjacent channel base station (AP: Access Point) 23 secures as an adjacent channel cell a service area 21.

Terminals 24 and 25 in the vicinity of the cell boundary area between the local channel service area 20 and adjacent channel service area 21 are connected to the local channel base station and adjacent channel base station, respectively. The terminal 24 is communicating with the local channel base station, and the terminal 25 is communicating with the adjacent channel base station. The two terminals 24 and 25 are at a short distance from each other, and far away from the respective base stations.

The terminals 24 and 25 are communicating with the respective base stations in a condition near the minimum sensitivity reception and maximum output transmission. In consequence, there is concern that the terminal 24, which is performing reception through a local channel, becomes incapable of reception due to interference caused by the transmission of the terminal 25 via an adjacent frequency channel at certain time.

In the case where the transmission and reception of the terminals are performed asynchronously without temporal correlation, a transmission and reception interference generator and a sufferer thereof may be reversed. Consequently, in the vicinity of the cell boundary area, the respective cells become dead zones and incommunicable areas between the cells increase, which causes reductions in the total area of communication cells, the coverage areas and capacity of the entire system, and throughput. This may produce the worst result that interference within the system damages the system itself.

In order to design a transmitter-receiver for avoiding that prospect, improvements in adjacent channel leakage power and spectrum mask are desired for the transmitting end, while highly selective design to enhance the tolerance for adjacent channel reception interference is essential for the receiving end.

The radio communication system characterized by the carrier sense multiple access method such as an IEEE802.11a wireless LAN is compatible with high-data-rate broadband. The occupied bandwidth of modulation transmission/reception waves is considerably wide, and the modulation sidelobe is extended. In addition, the capacity is increased by narrowing the frequency channel interval as much as possible to use limited frequency resources effectively. Therefore, the relative merits of the entire radio communication system is determined by how to improve the ability to eliminate high level adjacent channel interference signals. In other words, this is the main technical key point in designing radio circuits.

In the above description, the adjacent channel interference reception problem arises between the terminals, however, the same adjacent channel interference reception problem may arise between the base stations (AP: Access Point).

Conceivably, the problem is caused in the case where two (or more) channel frequency cells are placed in the same service area to increase only the capacity of the base stations by a factor of two (or more). In this case, two (or more) base stations are placed in close proximity to each other in about the same service area, and therefore, it is not possible to avoid the arrangement of cells in frequency-position relation where the base stations use adjacent frequency channels or next adjacent frequency channels.

In such instances, as is obvious, adjacent channel interference occurs between terminals respectively belonging to the base stations depending on their positions, and further, the adjacent channel interference problem always arises between the base stations depending on a positional relation according to the arrangement of the base stations. Therefore, descriptions of the block configuration and operation of a receiver given hereinafter will apply to a receiver of the terminal and that of the base station.

FIG. 2 (prior art 1) and FIG. 3 (prior art 2) are diagrams each showing the block configuration of a conventional receiver used in a broadband packet radio communication system characterized by the carrier sense multiple access method. As shown in FIG. 2, in the configuration of the receiver according to the prior art 1, a radio frequency signal is received by an antenna 1, and sent to a low noise amplifier (LNA) 3 via a selector switch 2 to be amplified. The amplified signal and the output of a local oscillator (LO) 5 are input in a MIXER 4 to perform frequency conversion.

For the nth-order IF signal converted using such superheterodyne method, digital synchronous detection process is performed after IF sampling, or A/D (Analog/Digital) conversion process is performed after I/Q separation using analog quasi-synchronous detection. In this case, an adjacent channel interference wave is suppressed by providing the nth-order IF section with a band fixed nth-order IF bandpass filter (BPF) 6 having a wideband characteristic (passband) equal to or wider than one-channel modulation occupied band width so as to secure the channel selectivity characteristic.

The output of the BPF 6 is connected to a received signal strength indicator (RSSI) 8 for carrier sensing the preamble of a received packet signal and a demodulator (DEMO) 9. The output of the RSSI 8 is sent to a carrier sense judgment device (CS) 10. When carrier sense is ON, the carrier sense judgment device (CS) 10 sends a demodulation start instruction to the DEMO 9.

As shown in FIG. 3, in the configuration of the receiver according to the prior art 2, a radio frequency signal is received by an antenna 1, and sent to a LNA 3 via a selector switch 2 to be amplified. The amplified signal and the output of a LO 5 are input in MIXERs 4 and 11 to perform frequency conversion directly to baseband.

For the baseband signal converted using such direct conversion method, quadrature detection (I/Q quadrature modulation/quasi-synchronous detection) is performed. In this case, an adjacent channel interference wave is suppressed by providing baseband I/Q sections with band fixed low-pass filters (LPF) 12 and 13 each having a cutoff frequency corresponding to one-channel modulation occupied band width (passband=one half of modulation occupied bandwidth) or more, respectively, so as to secure the channel selectivity characteristic (in the case of zero IF, LPF cutoff frequency=half or more than half of one channel).

The outputs from the LPFs 12 and 13 of the respective I/Q sections are connected to an RSSI 8 for carrier sensing the preamble of a received packet signal and a DEMO 9. The output of the RSSI 8 is sent to a CS 10. When carrier sense is ON, the CS 10 sends a demodulation start instruction to the DEMO 9.

Incidentally, the LPFs may be digital LPFs placed in digital baseband I/Q paths after IF sampling and digital synchronous detection process, or analog LPFs placed in analog I/Q baseband paths between analog quasi-synchronous detection and A/D conversion. Besides, both the digital LPF and analog LPF may be used to provide selectivity to the respective LPFs.

FIG. 4 is a diagram for explaining the reception operation of a conventional carrier sense multiple access system comprising a received signal strength indicator (RSSI) 8, a demodulator (DEMO) 9, and a carrier sense judgment device (CS) 10. As shown in FIG. 4, when the signal wave of the preamble of a received packet signal is input, the RSSI 8 detects the electric field strength of the received signal in faithful accordance with time waveform (step 100). The output of the RSSI undergoes averaging operation in the CS 10, and is compared with a carrier sense threshold value. When the output after the averaging operation is determined to be equal to or more than the preset threshold value corresponding to the minimum reception sensitivity level, the CS 10 recognizes that "carrier sense is ON" (step 101), and accordingly, sends a demodulation start instruction to the DEMO 9 (step 102). Having received the demodulation start instruction, the DEMO 9 initiates the demodulation process (step 103).

Problems that the Invention is to Solve

In the following, a description will be given of problems in the aforementioned prior art 1 and 2 which arise when adjacent channel interference occurs. In a broadband packet radio communication system characterized by the carrier sense multiple access method operated on a harsh frequency arrangement where the occupied bandwidth of modulation transmission/reception waves and modulation sidelobe are wide and the frequency channel interval is narrow, if the configuration as in the prior art is employed, a received signal connected to the RSSI 8 for carrier sensing the preamble of a received packet signal and a received signal connected to the DEMO 9 are subjected to band fixed channel filtering. As the band characteristic, a sufficiently wide passband is secured to pick up received signals from one channel. Therefore, when transmission and reception are carried out through a local channel with no adjacent channel interference, "carrier sense ON" can be detected by the RSSI output of a local channel reception wave without any problems, and thereby the normal demodulation process is performed.

However, in the radio environment where high level adjacent channel interference exists, problems arise with local channel reception. In accordance with the present invention, a broadband packet radio communication system characterized by the carrier sense multiple access method is operated on a frequency arrangement where the occupied bandwidth of modulation transmission/reception waves and modulation sidelobe are wider and the frequency channel interval is narrower. Therefore, in local channel reception waiting time (when RSSI operation continues), the adjacent leakage power spectra on both sides of an adjacent channel interference wave pass through a local channel band-limited filter.

In consequence, the power of the adjacent channel interference wave which has once leaked in cannot be discriminated on a reception standby system, and the unnecessary leakage adjacent channel interference power is propagated from the RSSI 8 to the CS 10. In the preamble processing procedure by a carrier sense judgment device of a high-speed radio communication standardized system, such as IEEE802.11a, whose functions are judged solely on power comparison, the adjacent channel interference signal is indistinguishable from a local channel carrier. Thus, an erroneous judgment, "carrier sense ON", is made.

Accordingly, carrier sense wrongly starts due to the high level adjacent channel interference wave input, resulting in erroneous operation in the reception/demodulation process being the next reception process event. Thus, the loss of reception chances during the erroneous reception/demodulation process (a period before the error is recognized later when received frames are assembled and false data are discarded) is substantially exposed, and the probability of transition from carrier sense based on local channel reception to normal demodulation start extremely decreases.

In other words, area coverage varies in the system as a whole, which leads to reductions in capacity and throughput, and the condition where it is difficult to form a continuous cell arrangement.

It is therefore an object of the present invention to improve the reception adjacent channel interference characteristic among a plurality of terminals as well as base stations in a broadband packet radio communication system characterized by the carrier sense multiple access method operated on a harsh frequency arrangement where an occupied band width of modulation transmission/reception waves and modulation sidelobe are wide and the frequency channel interval is narrow.

DISCLOSURE OF THE INVENTION

In accordance with the present invention, to achieve the objects mentioned above, in a receiver in a packet radio communication system using the carrier sense multiple access method, a received signal to a received signal strength indicator is subjected to narrowband filtering, while a received signal to a demodulator is subjected to wideband filtering.

By the narrowband channel filtering in the received signal strength detection operation, adjacent channel interference wave power components can be reduced as compared to local channel reception power components. Thus, correct reception/demodulation operation can be implemented.

In accordance with another aspect of the present invention, in a superheterodyne receiver in a packet radio communication system using the carrier sense multiple access method, electric field strength detection is performed for a received signal which has undergone frequency conversion from radio to intermediate frequency after filtering the received signal by a narrow bandpass filter, a carrier sense judgment is made based on the detection result, and in the case where the received signal is regarded as a carrier based on the judgment result, the received signal whose frequency has been converted to the intermediate frequency is demodulated after filtering the received signal by a wide bandpass filter.

In accordance with another aspect of the present invention, in a direct conversion or superheterodyne receiver having an I/Q baseband interface in a packet radio communication system using the carrier sense multiple access method, electric field strength detection is performed for a received signal which has undergone frequency conversion from radio to baseband frequency after filtering the received signal by narrowband low-pass filters, a carrier sense judgment is made based on the detection result, and in the case where the received signal is regarded as a carrier based on the judgment result, the received signal whose frequency has been converted to the baseband frequency is demodulated after filtering the received signal by wideband low-pass filters.

In accordance with another aspect of the present invention, in a superheterodyne receiver in a packet radio communication system using the carrier sense multiple access method, electric field strength detection is performed for a received signal which has undergone frequency conversion from radio to intermediate frequency after filtering the received signal by a variable bandpass filter controlled to have a narrowband characteristic, a carrier sense judgment is made based on the detection result, and in the case where the received signal is regarded as a carrier based on the judgment result, the received signal whose frequency has been converted to the intermediate frequency is demodulated after filtering the received signal by the variable bandpass filter controlled to have a wideband characteristic.

In accordance with another aspect of the present invention, in a direct conversion or superheterodyne receiver having an I/Q baseband interface in a packet radio communication system using the carrier sense multiple access method, electric field strength detection is performed for a received signal which has undergone frequency conversion from radio to baseband frequency after filtering the received signal by variable low-pass filters controlled to have a narrowband characteristic, a carrier sense judgment is made based on the detection result, and in the case where the received signal is regarded as a carrier based on the judgment result, the received signal whose frequency has been converted to the baseband frequency is demodulated after filtering the received signal by the variable low-pass filters controlled to have a wideband characteristic.

In accordance with another aspect of the present invention, the variable bandpass filter or the variable low-pass filters is/are controlled to have a narrowband characteristic in the initial state, and the narrowband characteristic is changed to a wideband characteristic when the received signal is regarded as a carrier based on the carrier sense judgment result.

In accordance with another aspect of the present invention, the bandpass filter having a narrowband characteristic is provided with a passband narrower than one-channel modulation occupied bandwidth, and the bandpass filter having a wideband characteristic is provided with a passband equal to or wider than the one-channel modulation occupied band width.

In accordance with another aspect of the present invention, the low-pass filters having a narrowband characteristic are provided with a passband narrower than one half-channel modulation occupied bandwidth, and the low-pass filters having a wideband characteristic are provided with a passband equal to or wider than the one half-channel modulation occupied band width.

Figure 1:
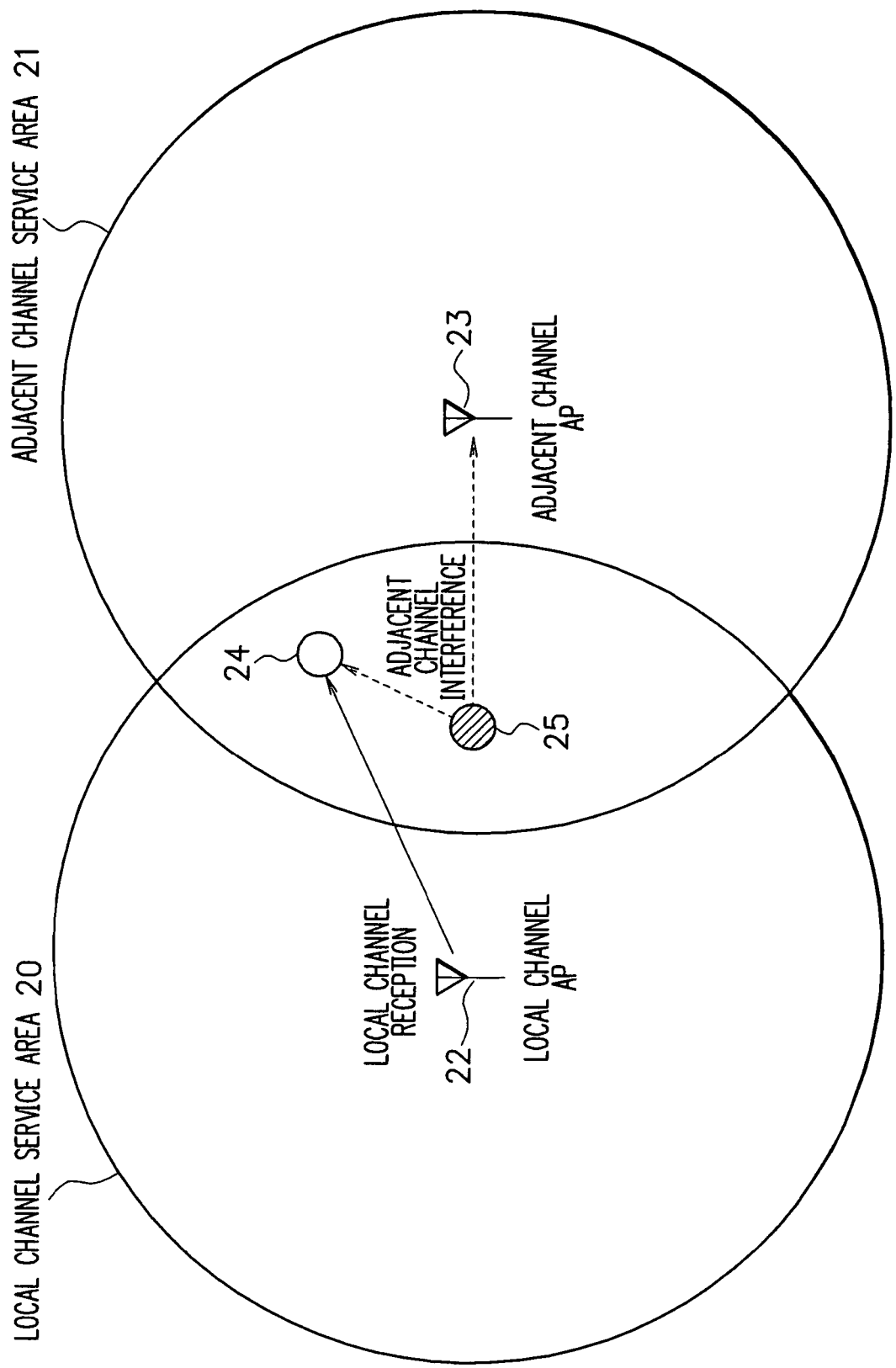
FIG. 1 is a diagram showing the configuration of an entire system for explaining problems involved in the cell relation between adjacent frequency channels.
Figure 2:
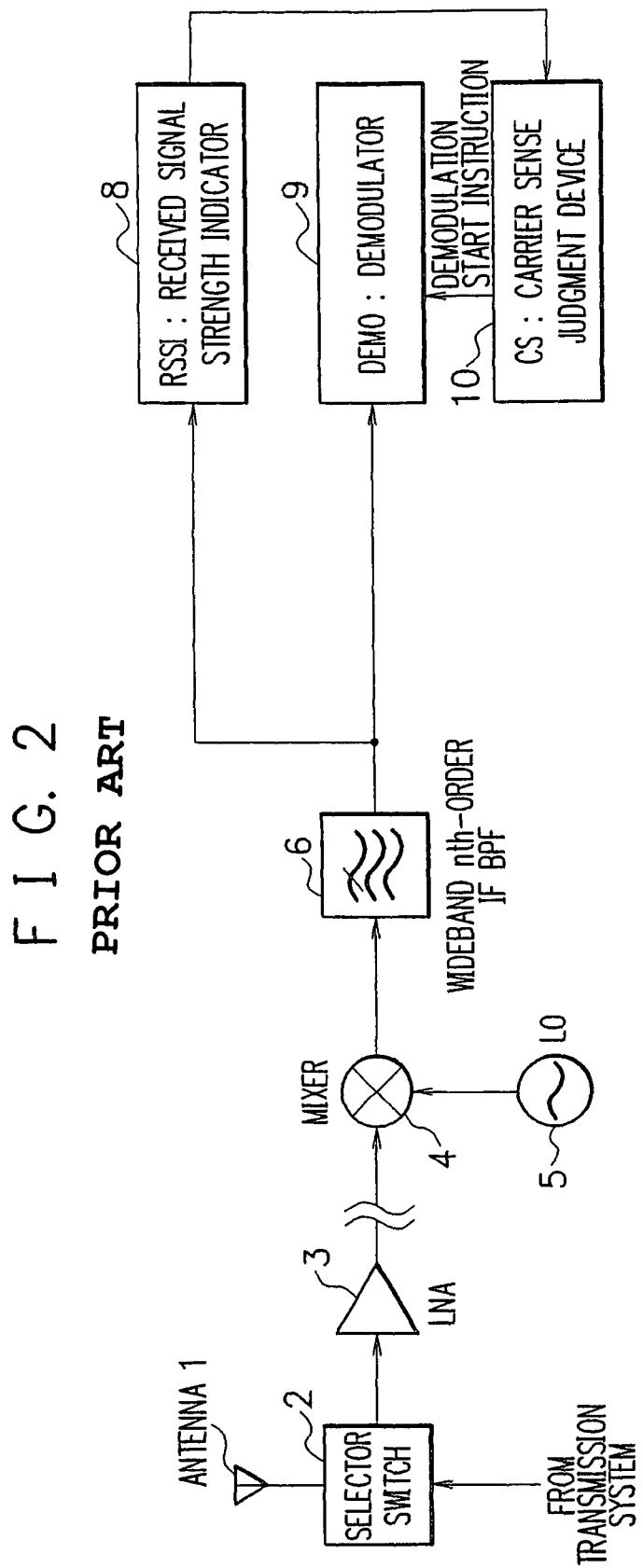
FIG. 2 is a block diagram showing the configuration of a conventional receiver used in a broadband packet radio communication system characterized by the carrier sense multiple access method (prior art 1).
Figure 3:
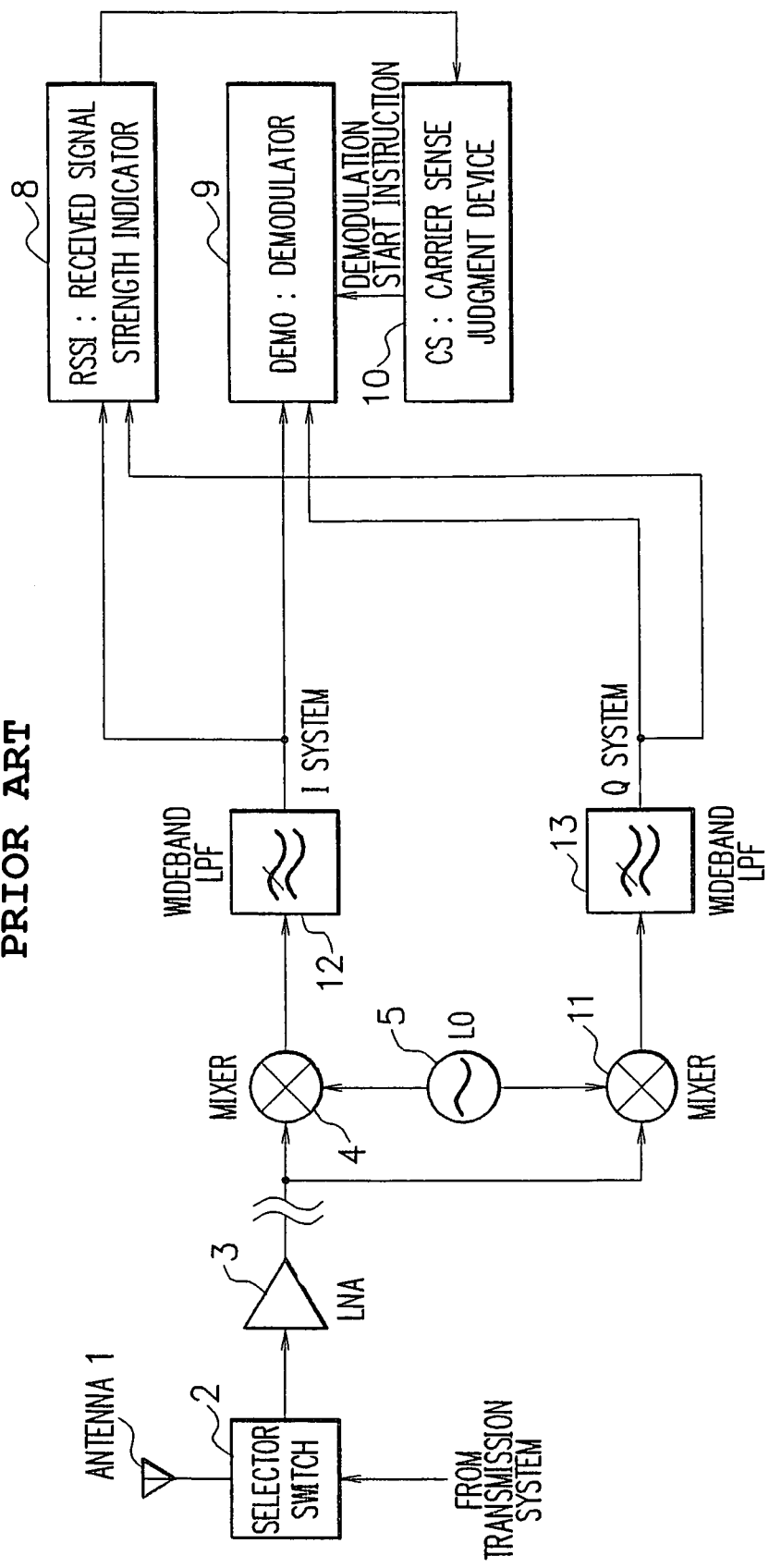
FIG. 3 is a block diagram showing the configuration of a conventional receiver used in a broadband packet radio communication system characterized by the carrier sense multiple access method (prior art 2).
Figure 4:
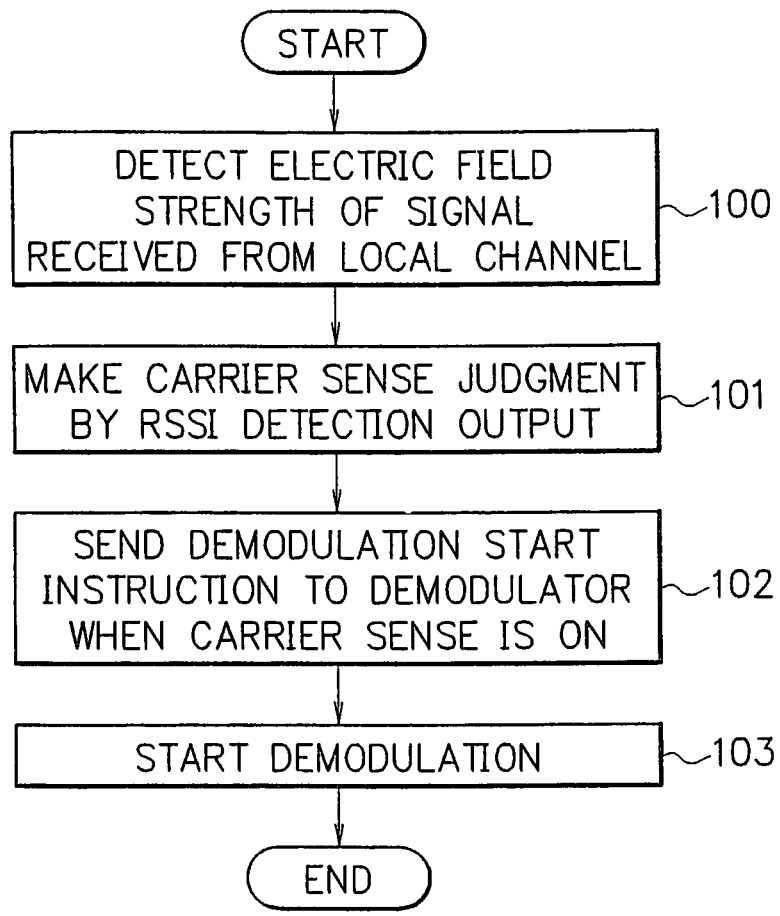
FIG. 4 is a diagram for explaining the reception operation of a conventional carrier sense multiple access system comprising a received signal strength indicator (RSSI) 8, a demodulator (DEMO) 9, and a carrier sense judgment device (CS) 10.

Incidentally, the reference numeral 1 represents an antenna; the reference numeral 2 represents a selector switch; the reference numeral 3 represents a low noise amplifier (LNA); the reference numerals 4 and 11 represent MIXERs; the reference numeral 5 represents a local oscillator (LO); the reference numeral 6 represents a wideband fixed nth-order IF bandpass filter (BPF); the reference numeral 7 represents a narrowband fixed nth-order IF bandpass filter (BPF); the reference numeral 8 represents a received signal strength indicator (RSSI); the reference numeral 9 represents a demodulator (DEMO); the reference numeral 10 represents a carrier sense judgment device (CS) 10; the reference numerals 12 and 13 represent wideband fixed low-pass filters (LPF); the reference numerals 14 and 15 represent narrowband fixed low-pass filters (LPF); the reference numeral 16 represents a variable nth-order IF bandpass filter (BPF); the reference numerals 17 and 18 represent variable low-pass filters (LPF); the reference numeral 20 represents a local channel cell service area; the reference numeral 21 represents an adjacent channel cell service area; the reference numeral 22 represents a local channel base station (AP: Access Point); the reference numeral 23 represents an adjacent channel base station (AP: Access Point); and the reference numerals 24 and 25 represent terminals.

BEST MODE FOR CARRYING OUT THE INVENTION

Figure 5:
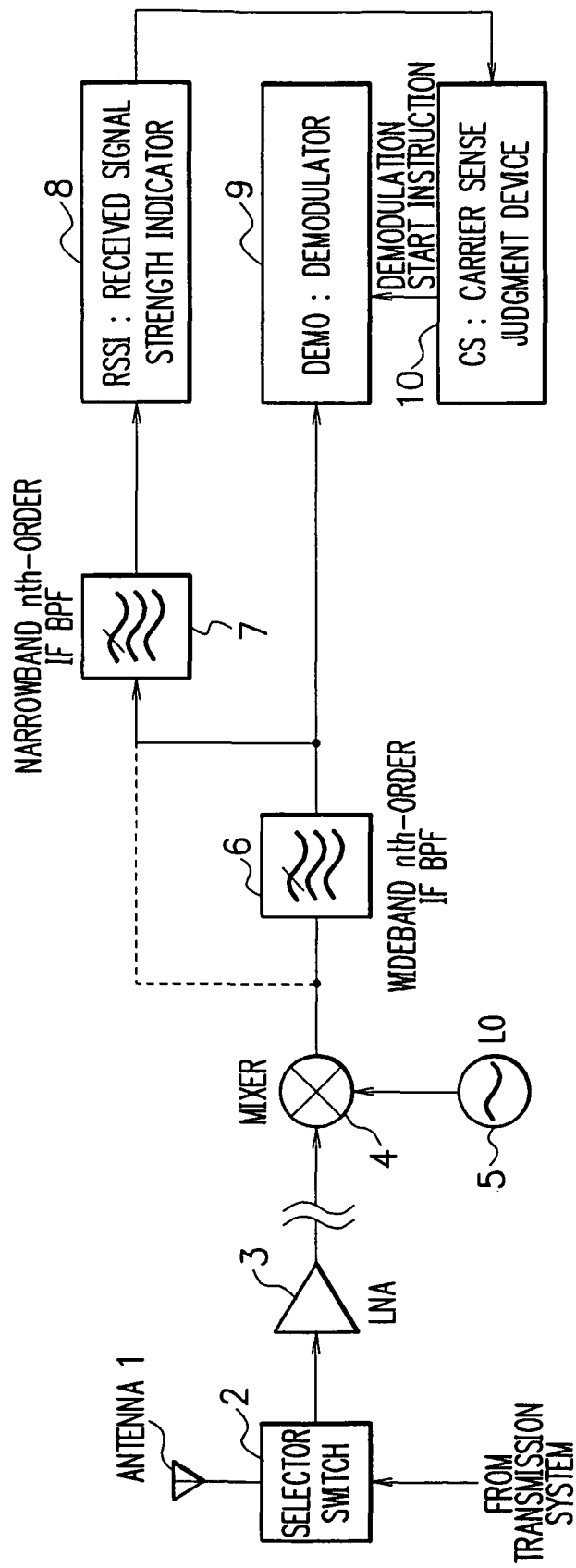
FIG. 5 is a block diagram showing the configuration of a receiver used in a broadband packet radio communication system characterized by the carrier sense multiple access method according to the first embodiment of the present invention.

Referring now to the drawings, an embodiment (first embodiment) of the present invention will be described. FIG. 5 is a block diagram showing the configuration of a receiver used in a broadband packet radio communication system characterized by the carrier sense multiple access method according to the first embodiment of the present invention. As shown in FIG. 5, in the configuration of the receiver according to the first embodiment of the present invention, a radio frequency signal is received by an antenna 1, and sent to a low noise amplifier (LNA) 3 via a selector switch 2 to be amplified. The amplified signal and the output of a local oscillator (LO) 5 are input in a MIXER 4 to perform frequency conversion.

For the nth-order IF signal converted using such superheterodyne method, digital synchronous detection process is performed after IF sampling, or A/D (Analog/Digital) conversion process is performed after quadrature demodulation to analog baseband using analog quasi-synchronous detection. In this case, an adjacent channel interference wave is suppressed by providing the nth-order IF section with a band fixed nth-order IF bandpass filter (BPF) 6 having a wideband characteristic (passband) equal to or wider than one-channel modulation occupied band width so as to secure the channel selectivity characteristic. The output of the BPF 6 is connected to a demodulator (DEMO) 9.

The output of the band fixed nth-order IF bandpass filter (BPF) 6 is also connected to a received signal strength indicator (RSSI) 8 for carrier sensing the preamble of a received packet signal via a band fixed nth-order IF bandpass filter (BPF) 7 having a narrowband characteristic (passband) narrower than the one-channel modulation occupied bandwidth. The output of the RSSI 8 is sent to a carrier sense judgment device (CS) 10. When carrier sense is ON, the CS 10 sends a demodulation start instruction to the DEMO 9.

Incidentally, the nth-order IF signal may be input directly or via the wideband fixed nth-order IF BPF 6 to the narrowband fixed nth-order IF BPF 7.

Figure 6:
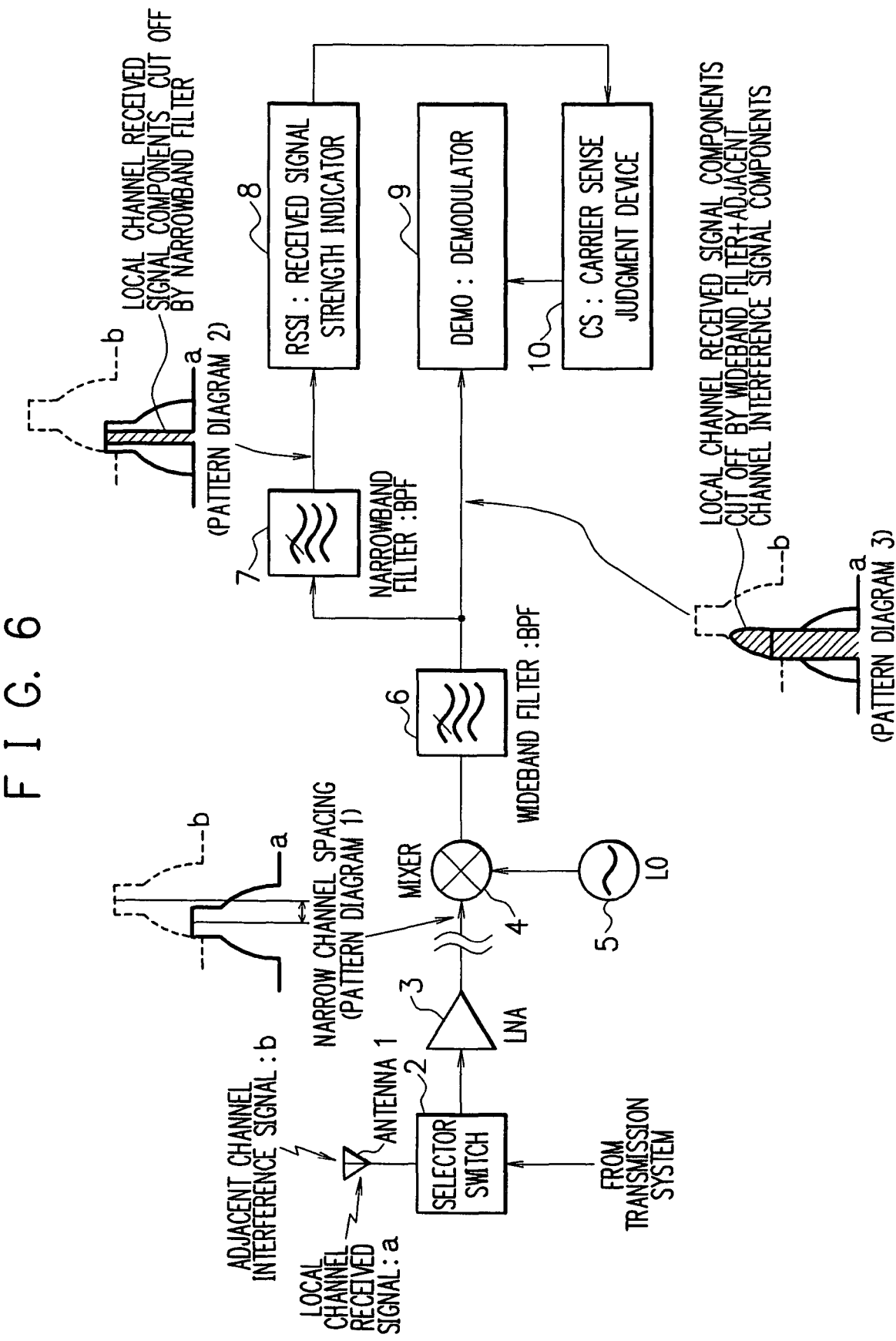
FIG. 6 is a diagram for explaining the operation of the receiver used in a broadband packet radio communication system characterized by the carrier sense multiple access method based on the configuration depicted in FIG. 5.

FIG. 6 is a diagram for explaining the operation of the receiver used in a broadband packet radio communication system characterized by the carrier sense multiple access method based on the configuration depicted in FIG. 5. In FIG. 6, pattern diagram 1 shows, as reception level, a frame format of adjacent channel interference condition in the adjacent frequency cell boundary area shown in FIG. 1. The solid line indicates the spectrum of a signal received from a local channel: a local channel received signal (a), while the dashed line indicates the spectrum of a high level interference signal received from an adjacent channel: an adjacent channel interference signal (b).

As can be seen in pattern diagram 1 of FIG. 6, the frequency spectrum spreads and the assigned frequency interval is narrow. Consequently, the sidelobe power of adjacent channel interference wave spreading over wideband leaks in the band of the local channel before the channel band limit in respective RSSI and reception/demodulation systems.

In this condition, both the RSSI and reception/demodulation systems are band-limited with a wide passband equal to or wider than the one channel in conventional filtering techniques. In such cases, leakage adjacent channel interference wave power dominantly reaches to the RSSI system, and RSSI detection caused by the adjacent channel interference wave leads to a carrier sense error. Accordingly, reception operation wrongly starts, and all the following processes for the preamble of a received packet (AFC/phase lock, timing detection, etc.) are erroneously performed, resulting in the loss of proper reception chances.

On the other hand, as can be seen in pattern diagram 2 of FIG. 6, by performing narrowband filtering in the reception/RSSI system with the band fixed nth-order IF BPF 7 having a narrowband characteristic (passband) narrower than the one-channel modulation occupied bandwidth, adjacent channel interference wave power components can be reduced as compared to local channel reception power components. Thereby, correct received signal strength detection operation and carrier sense judgment operation can be implemented.

In other words, application of the present invention enables local channel reception in a broadband packet radio communication system characterized by the carrier sense multiple access method even when adjacent channel interference wave input is high. Thus, it is possible to configure a system that is highly resistant to adjacent channel interference wave.

Besides, as can be seen in pattern diagram 3 of FIG. 6, local channel filtering is performed in the reception/demodulation system with the band fixed nth-order IF BPF 6 having a wideband characteristic (passband) equal to or wider than the one-channel modulation occupied band width as in the conventional techniques.

As is described above, the narrowband filtering, which is performed to decrease the domination of the RSSI system by an adjacent channel interference wave, increases the rate of successful carrier sense as well as the frequency with which necessary demodulation operation starts at proper time for the preamble of a packet from a local channel. When proper demodulation operation starts, local channel reception can be implemented with an ordinary error rate determined by the C/(N+I) ratio by virtue of the wideband filter provided to the demodulation system. Thus, it is possible to maintain adequate communication quality efficiently with resistance to adjacent channel interference.

Incidentally, in the aforementioned C/(N+I) ratio, C is the power of local channel received signal components cut off by wideband filtering; N is total noise power in the reception systems; and I is the power of adjacent channel interference wave that leaks in the local channel.

Additionally, it is obvious that, in accordance with the present invention, local channel reception performance equal or superior to that obtainable by the conventional techniques can be expected also in the case where an adjacent channel interference wave is low or there is no adjacent channel interference wave.

Figure 7:
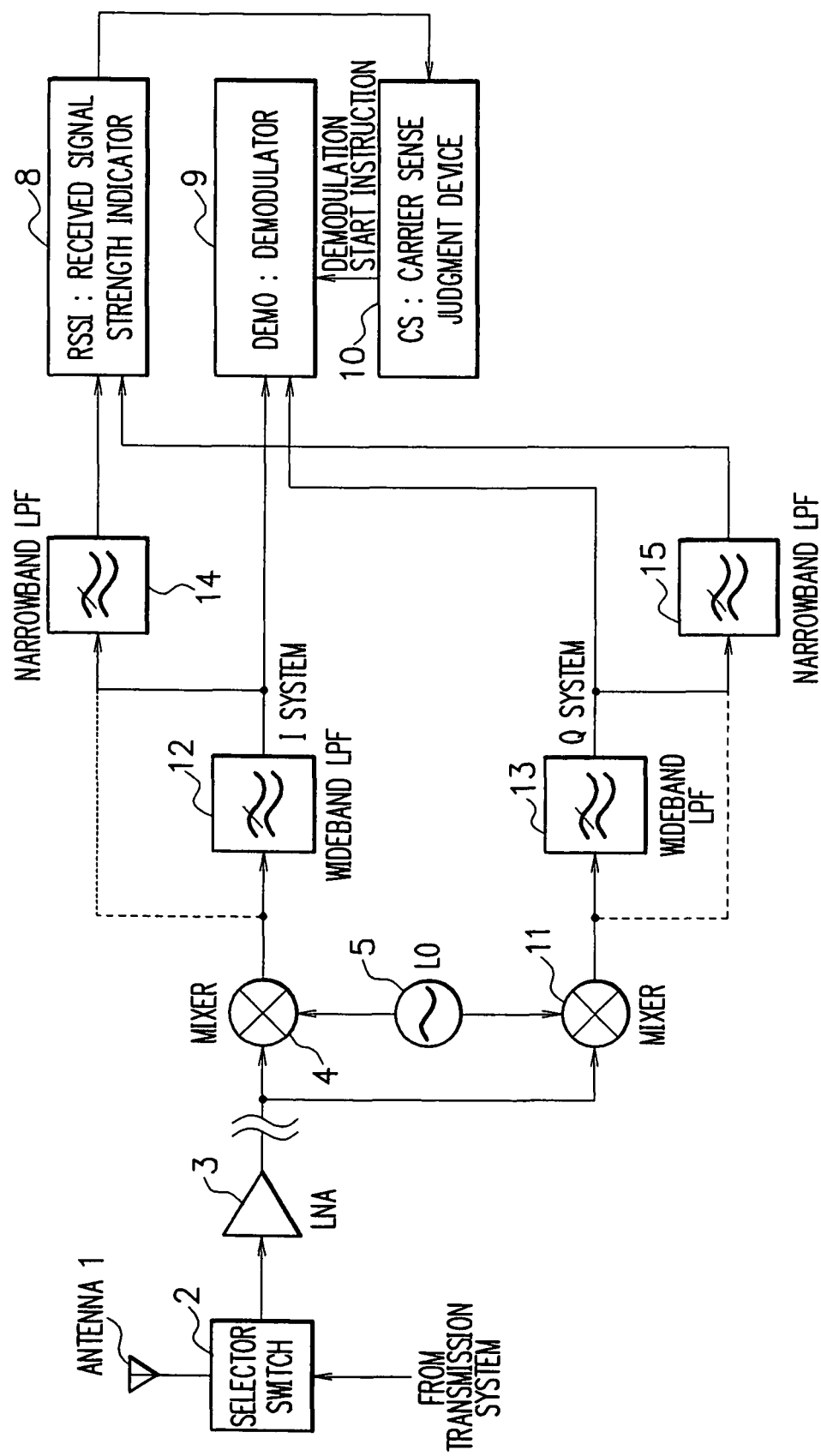
FIG. 7 is a block diagram showing the configuration of a receiver used in a broadband packet radio communication system characterized by the carrier sense multiple access method according to the second embodiment of the present invention.

In the following, another embodiment (second embodiment) of the present invention will be described. FIG. 7 is a block diagram showing the configuration of a receiver used in a broadband packet radio communication system characterized by the carrier sense multiple access method according to the second embodiment of the present invention. As shown in FIG. 7, in the configuration of the receiver according to the second embodiment of the present invention, a radio frequency signal is received by an antenna 1, and sent to a low noise amplifier (LNA) 3 via a selector switch 2 to be amplified. The amplified signal and the output of a local oscillator (LO) 5 are input in MIXERs 4 and 11 to perform frequency conversion directly to baseband.

For the baseband signal converted using such direct conversion method, quadrature detection (I/Q quadrature modulation/quasi-synchronous detection) is performed. In this case, an adjacent channel interference wave is suppressed by providing baseband I/Q sections with wideband fixed low-pass filters (LPF) 12 and 13 each having a cutoff frequency corresponding to one-channel modulation occupied band width (passband=one half of modulation occupied bandwidth) or more, respectively, so as to secure the channel selectivity characteristic. The outputs from the LPFs 12 and 13 of the respective I/Q sections are connected to a demodulator (DEMO) 9.

The outputs from the band fixed low-pass filters (LPF) 12 and 13 of the respective baseband I/Q sections are also connected to a received signal strength indicator (RSSI) 8 for carrier sensing the preamble of a received packet signal via narrowband fixed low-pass filters (LPF) 14 and 15 each having a cutoff frequency corresponding to less than the one-channel modulation occupied band width (passband=one half of modulation occupied bandwidth). The output of the RSSI 8 is sent to a carrier sense judgment device (CS) 10. When carrier sense is ON, the carrier sense judgment device (CS) 10 sends a demodulation start instruction to the DEMO 9.

Incidentally, the baseband signal may be input directly or via the wideband fixed LPFs 12 and 13 to the narrowband fixed LPFs 14 and 15.

That is, the circuitry according to the second embodiment is characterized in that, in the configuration of the direct conversion receiver, narrowband channel filtering (with narrowband LPFs each having a passband narrower than one half of one-channel occupied band width) and wideband channel filtering (with wideband LPFs each having a passband equal to or wider than one half of one-channel occupied bandwidth) are performed in an RSSI system and a reception/demodulation system, respectively.

As in the first embodiment, the narrowband filtering, which is performed to decrease the domination of the RSSI system by an adjacent channel interference wave, increases the rate of successful carrier sense as well as the frequency with which necessary demodulation operation starts at proper time for the preamble of a packet from a local channel. When proper demodulation operation starts, local channel reception can be implemented with an ordinary error rate determined by the C/(N+I) ratio by virtue of the wideband filters provided to the demodulation system. Thus, it is possible to maintain adequate communication quality efficiently with resistance to adjacent channel interference.

Incidentally, in the case where the superheterodyne receiver of the first embodiment has an I/Q baseband interface and perform analog quasi-synchronous detection for the nth-order IF signal, wideband fixed low-pass filters (LPF) 12 and 13, each having a cutoff frequency corresponding to one-channel modulation occupied band width (passband=one half of modulation occupied bandwidth) or more, are inserted in baseband I/Q sections, respectively, and the outputs therefrom are connected to the demodulator (DEMO) 9 as in the second embodiment. Besides, the outputs from the band fixed low-pass filters (LPF) 12 and 13 are also connected to the received signal strength indicator (RSSI) 8 via narrowband fixed low-pass filters (LPF) 14 and 15 each having a cutoff frequency corresponding to less than the one-channel modulation occupied band width (passband=one half of modulation occupied bandwidth).

Figure 8:
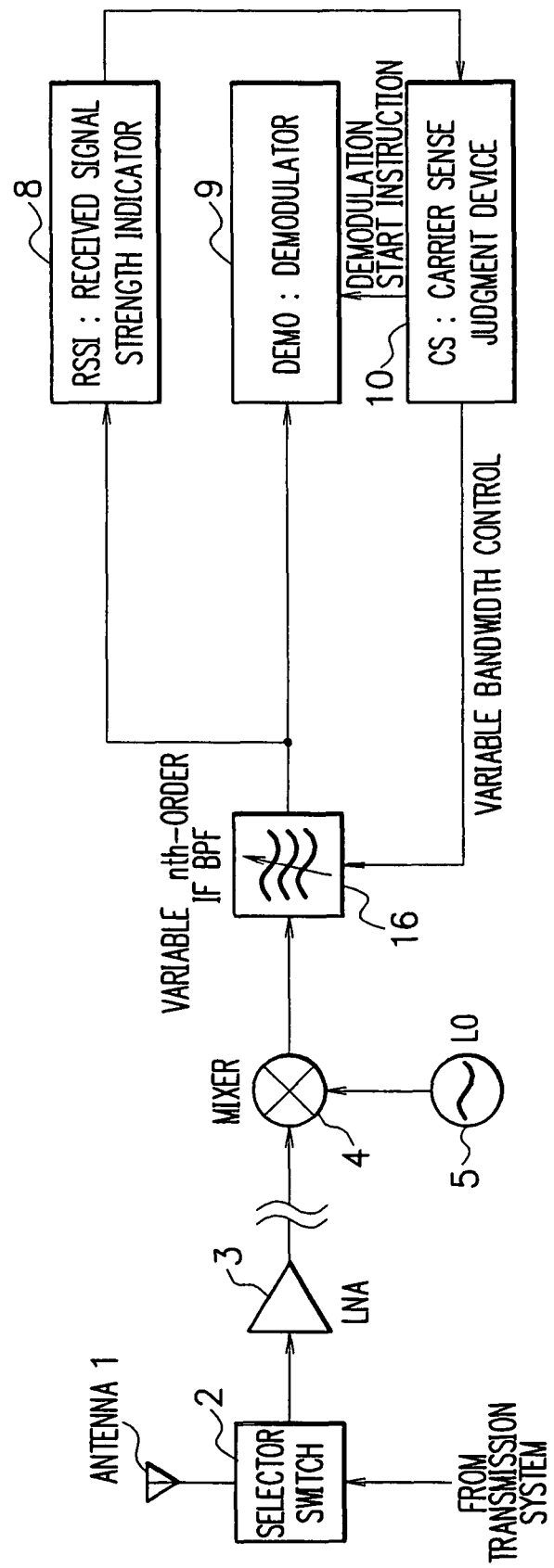
FIG. 8 is a block diagram showing the configuration of a receiver used in a broadband packet radio communication system characterized by the carrier sense multiple access method according to the third embodiment of the present invention.

In the following, yet another embodiment (third embodiment) of the present invention will be described. FIG. 8 is a block diagram showing the configuration of a receiver used in a broadband packet radio communication system characterized by the carrier sense multiple access method according to the third embodiment of the present invention. As shown in FIG. 8, in the configuration of the receiver according to the third embodiment of the present invention, a radio frequency signal is received by an antenna 1, and sent to a low noise amplifier (LNA) 3 via a selector switch 2 to be amplified. The amplified signal and the output of a local oscillator (LO) 5 are input in a MIXER 4 to perform frequency conversion.

For the nth-order IF signal converted using such superheterodyne method, digital synchronous detection process is performed after IF sampling, or A/D (Analog/Digital) conversion process is performed after quadrature demodulation to analog baseband using analog quasi-synchronous detection. In this case, an adjacent channel interference wave is suppressed by providing the nth-order IF section with a variable nth-order IF bandpass filter (BPF) 16, which is controlled to have a narrowband characteristic (passband) narrower than the one-channel modulation occupied bandwidth during initial RSSI standby operation in reception and controlled to have a wideband characteristic (passband) equal to or wider than one-channel modulation occupied band width during subsequent demodulation operation in reception so as to secure the channel selectivity characteristic.

The output of the BPF 16 is connected to an RSSI 8 for carrier sensing the preamble of a received packet signal and a DEMO 9. The output of the RSSI 8 is sent to a CS 10. When carrier sense is ON, the CS 10 sends a demodulation start instruction to the DEMO 9.

In this embodiment, the carrier sense judgment device (CS) 10 electrically controls the variable bandpass filter (BPF) 16 to set its bandwidth to narrow or wide. In the initial state, the variable BPF 16 has a narrowband characteristic in response to the detection operation of the RSSI. The RSSI 8 detects the electric field strength of the preamble of a received packet signal. When having determined that carrier sense is ON, the CS 10 sends the variable BPF 16 a signal to switch the narrowband characteristic to a wideband characteristic. Thereby, the received signal is demodulated after wideband channel filtering.

That is, the circuitry according to the third embodiment is characterized in that, in the configuration of the superheterodyne receiver, there is provided a variable BPF witch can be controlled so that narrowband channel filtering is performed during RSSI standby operation while wideband channel filtering is performed during subsequent reception/demodulation operation.

As in the first embodiment, the narrowband filtering, which is performed to decrease the domination of the RSSI system by an adjacent channel interference wave, increases the rate of successful carrier sense as well as the frequency with which necessary demodulation operation starts at proper time for the preamble of a packet from a local channel. When proper demodulation operation starts, local channel reception can be implemented with an ordinary error rate determined by the C/(N+I) ratio by virtue of the wideband filtering. Thus, it is possible to maintain adequate communication quality efficiently with resistance to adjacent channel interference.

Figure 9:
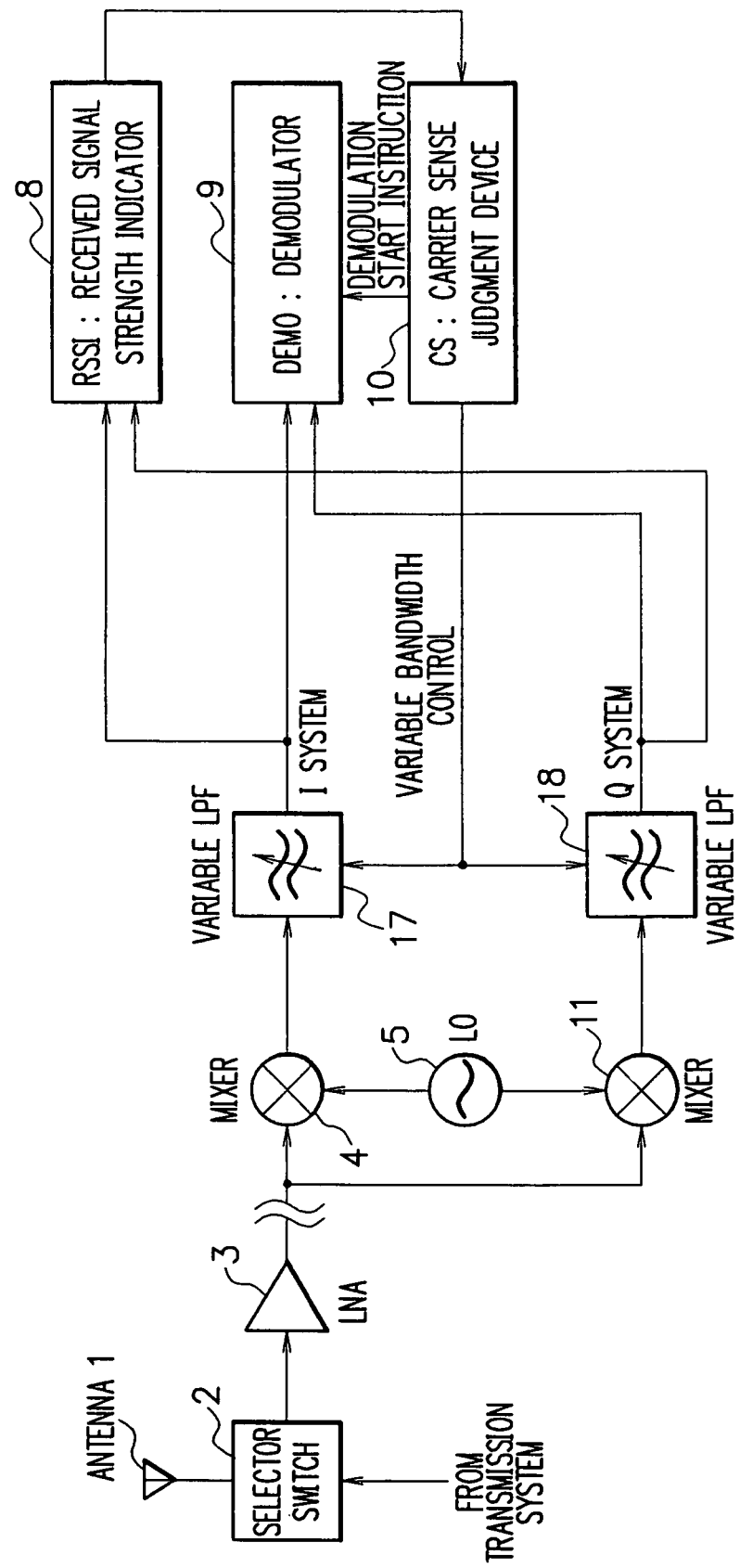
FIG. 9 is a block diagram showing the configuration of a receiver used in a broadband packet radio communication system characterized by the carrier sense multiple access method according to the fourth embodiment of the present invention.

In the following, yet another embodiment (fourth embodiment) of the present invention will be described. FIG. 9 is a block diagram showing the configuration of a receiver used in a broadband packet radio communication system characterized by the carrier sense multiple access method according to the fourth embodiment of the present invention. As shown in FIG. 9, in the configuration of the receiver according to the fourth embodiment of the present invention, a radio frequency signal is received by an antenna 1, and sent to a low noise amplifier (LNA) 3 via a selector switch 2 to be amplified. The amplified signal and the output of a local oscillator (LO) 5 are input in MIXERs 4 and 11 to perform frequency conversion directly to baseband.

For the baseband signal converted using such direct conversion method, quadrature detection (I/Q quadrature modulation/quasi-synchronous detection) is performed. In this case, an adjacent channel interference wave is suppressed by providing baseband I/Q sections with variable low-pass filters (LPF) 17 and 18, each of which is controlled to have a narrowband characteristic or a cutoff frequency corresponding to less than one-channel modulation occupied band width (passband=one half of modulation occupied bandwidth) during initial RSSI standby operation in reception and controlled to have a wideband characteristic or a cutoff frequency corresponding to the one-channel modulation occupied band width (passband=one half of modulation occupied bandwidth) or more during subsequent demodulation operation in reception so as to secure the channel selectivity characteristic.

The outputs from the LPFs 17 and 18 of the respective I/Q sections are connected to an RSSI 8 for carrier sensing the preamble of a received packet signal and a DEMO 9. The output of the RSSI 8 is sent to a CS 10. When carrier sense is ON, the CS 10 sends a demodulation start instruction to the DEMO 9.

In this embodiment, the carrier sense judgment device (CS) 10 electrically controls the variable low-pass filters (LPF) 17 and 18 to set their bandwidths to narrow or wide. In the initial state, the variable LPFs 17 and 18 each have a narrowband characteristic in response to the detection operation of the RSSI. The RSSI 8 detects the electric field strength of the preamble of a received packet signal. When having determined that carrier sense is ON, the CS 10 sends each of the variable LPFs 17 and 18 a signal to switch the narrowband characteristic to a wideband characteristic. Thereby, the received signal is demodulated after wideband channel filtering.

That is, the circuitry according to the fourth embodiment is characterized in that, in the configuration of the direct conversion receiver, there is provided variable LPFs witch can be controlled so that narrowband channel filtering is performed during RSSI standby operation while wideband channel filtering is performed during subsequent reception/demodulation operation.

As in the first embodiment, the narrowband filtering, which is performed to decrease the domination of the RSSI system by an adjacent channel interference wave, increases the rate of successful carrier sense as well as the frequency with which necessary demodulation operation starts at proper time for the preamble of a packet from a local channel. When proper demodulation operation starts, local channel reception can be implemented with an ordinary error rate determined by the C/(N+I) ratio by virtue of the wideband filtering. Thus, it is possible to maintain adequate communication quality efficiently with resistance to adjacent channel interference.

Incidentally, in the case where the superheterodyne receiver of the third embodiment has an I/Q baseband interface and perform analog quasi-synchronous detection for the nth-order IF signal, baseband I/Q sections are provided with variable low-pass filters (LPF) 17 and 18, each of which is controlled to have a narrowband characteristic or a cutoff frequency corresponding to less than one-channel modulation occupied band width (passband=one half of modulation occupied bandwidth) during initial RSSI standby operation in reception and controlled to have a wideband characteristic or a cutoff frequency corresponding to the one-channel modulation occupied band width (passband=one half of modulation occupied bandwidth) or more during subsequent demodulation operation in reception, respectively, and the outputs therefrom are connected to the RSSI 8 and the DEMO 9 as in the fourth embodiment.

INDUSTRIAL APPLICABILITY

As set forth hereinabove, in accordance with the present invention, narrowband channel filtering and wideband channel filtering are performed in an RSSI system and a reception/demodulation system, respectively. Thereby, it is possible to improve the reception adjacent channel interference characteristic among a plurality of terminals as well as base stations in a broadband packet radio communication system characterized by the carrier sense multiple access method operated on a harsh frequency arrangement where an occupied band width of modulation transmission/reception waves and modulation sidelobe are wide and the frequency channel interval is narrow.

Besides, even when high level adjacent channel interference wave is generated, it is possible to minimize the loss of reception chances from the wrong start of carrier sense due to the high level adjacent channel interference wave input and the following erroneous operation in the reception/demodulation process: the next reception process event, in the initial stage of received packet preamble processing. Thus, the probability of transition from carrier sense based on local channel reception to normal demodulation start can be increased.

That is, in accordance with the present invention, there is proposed a reception system capable of stable local channel reception/demodulation operation such that the demodulation operation achieves completion. Consequently, it is possible to ensure the area coverage and capacity of the entire system as well as a wide range of system operations with high throughput and continuous cell arrangement.

The invention claimed is:

1. An interference suppression method for a receiver in a packet radio communication system using the carrier sense multiple access method, comprising the sequential steps of: filtering a received signal by narrowband filtering; at a received signal strength indicator, detecting an electric field strength of the received signal; at a carrier sense judgment device, receiving an output from the received signal strength indicator indicating the electric field strength of the received signal; at the carrier sense judgment device, determining, based on the output from the received signal strength indicator, whether the received signal is a carrier; and upon a determination at the carrier sense judgment device that the received signal is a carrier, changing the filtering of the received signal from narrowband filtering to wideband filtering without being subjected to the narrowband filtering, and causing a demodulator to begin demodulating the received signal filtered by wideband filtering; and wherein the filtering, in a first mode having the narrowband characteristic, is configured with a passband that is narrower than a one-channel modulation occupied bandwidth and the filtering, in a second mode having the wideband characteristic, is configured with a passband equal to or wider than the one-channel modulation occupied bandwidth.

2. The interference suppression method claimed in claim 1, wherein the filtering is accomplished by a variable low-pass filter controlled by the carrier sense judgment device, the variable low-pass filter configured to output to both the received signal strength indicator and the demodulator, and wherein the variable low-pass filter is controlled, by the carrier sense judgment device, to have a first cutoff frequency in a first mode where the received signal is not regarded as a carrier based on the output of the received signal strength indicator, and to have a second cutoff frequency higher than the first cutoff frequency in a second mode where the received signal is regarded as a carrier based on the output of the received signal strength indicator.

3. The interference suppression method claimed in claim 1,
wherein the received signal is a signal based on a packet communication system,
wherein the filtering is accomplished by a variable low-pass filter controlled by the carrier sense judgment device, the variable low-pass filter configured to output to both the received signal strength indicator and the demodulator, and
wherein the variable low-pass filter is controlled, by the carrier sense judgment device, to have a first cutoff frequency in a first mode where the received signal is not judged to be a carrier based on the output of the received signal strength indicator, and
wherein, at the received signal strength indicator, where the electric field strength is detected for a preamble of a packet signal within the received signal, and the output of the received signal strength indicator for said preamble is judged by the carrier sense judgment device to indicate that the received signal is a carrier, the carrier judgment device controls the variable low-pass filter to have a second cutoff frequency higher than the first cutoff frequency in a second mode and causes the demodulator to begin demodulating the received signal filtered by the variable low-pass filter operating in the second mode.

4. The interference suppression method claimed in claim 1,
wherein the received signal is a signal based on a packet communication system, and
wherein, at the received signal strength indicator, where the electric field strength is detected for a preamble of a packet signal within the received signal, and the output of the received signal strength indicator for said preamble is judged by the carrier sense judgment device to indicate that the received signal is a carrier, the carrier judgment device causes the filtering of the received signal to be changed from the narrowband filtering to the wideband filtering and causes the demodulator to begin demodulating the received signal filtered by wideband filtering.

5. An interference suppression method for a superheterodyne receiver in a packet radio communication system using the carrier sense multiple access method, comprising the steps of: filtering a received signal through a bandpass filter configured with a narrowband characteristic to produce a narrowband filtered signal, the received signal having undergone frequency conversion from radio to intermediate frequency; receiving, at a received signal strength indicator, the narrowband filtered signal, the received signal strength indicator generating an RSSI output that indicates an electric field strength of the narrowband filtered signal; and at a carrier sense judgment device, receiving the RSSI output and generating a carrier sense judgment based on a detected strength of the narrowband filtered signal as indicated by the RSSI output, and in the case where the received signal is regarded as a carrier, based on the carrier sense judgment, causing a demodulator to demodulate the received signal whose frequency has been converted to the intermediate frequency and filtered by the bandpass filter reconfigured with a wideband characteristic, wherein the wideband characteristic is wider than the narrowband characteristic; and wherein the bandpass filter, in a first mode having the narrowband characteristic, is configured with a passband that is narrower than a one-channel modulation occupied bandwidth and the bandpass filter, in a second mode having the wideband characteristic, is configured with a passband equal to or wider than the one-channel modulation occupied bandwidth.

6. The interference suppression method claimed in claim 5,
wherein the frequency conversion of the received signal is caused by amplifying the received signal with a low noise amplifier as an amplified signal, whereupon the amplified signal is input, with output from a local oscillator, to two mixers, and
wherein the bandpass filter comprises two variable low-pass filters, each respectively connected to one of the mixers,
each of the variable low-pass filters configured to output both to the received signal strength indicator for carrier sensing a preamble of a received packet signal and to the demodulator, and
each of said variable low-pass filters controlled, by the carrier sense judgment device, to have a first cutoff frequency in a first mode where the received signal is not regarded as a carrier based on the RSSI output, and to have a second cutoff frequency higher than the first cutoff frequency in a second mode where the received signal is regarded as a carrier based on the RSSI output and the demodulator is activated to demodulate the received signal.

7. An interference suppression method for a superheterodyne receiver in a packet radio communication system using the carrier sense multiple access method, comprising the steps of: filtering a received signal through a bandpass filter configured with a narrowband characteristic to produce a narrowband filtered signal, the received signal having undergone frequency conversion from radio to a baseband frequency; receiving, at a received signal strength indicator, the narrowband filtered signal, the received signal strength indicator generating an RSSI output that indicates an electric field strength of the narrowband filtered signal; at a carrier sense judgment device, receiving the RSSI output and generating a carrier sense judgment based on a detected strength of the narrowband filtered signal as indicated by the RSSI output; and at the carrier sense judgment device, upon a determination that the received signal is a carrier based on the carrier sense judgment, causing the bandpass filter to be reconfigured to operate with a wideband characteristic and causing a demodulator to demodulate the received signal whose frequency has been converted to the baseband frequency and filtered by the bandpass filter reconfigured with the wideband characteristic, wherein the wideband characteristic is wider than the narrowband characteristic; wherein the bandpass filter, in a first mode having the narrowband characteristic, is configured with a passband that is narrower than a one-channel modulation occupied bandwidth and the bandpass filter, in a second mode having the wideband characteristic, is configured with a passband equal to or wider than the one-channel modulation occupied bandwidth.

8. The interference suppression method claimed in claim 7,
wherein the frequency conversion of the received signal is caused by amplifying the received signal with a low noise amplifier as an amplified signal, whereupon the amplified signal is input, with output from a local oscillator, to two mixers, and
wherein the bandpass filter comprises two variable low-pass filters, each respectively connected to one of the mixers,
each of the variable low-pass filters configured to output both to the received signal strength indicator for carrier sensing a preamble of a received packet signal and to the demodulator, and each of said variable low-pass filters controlled, by the carrier sense judgment device, to have a first cutoff frequency in a first mode where the received signal is not regarded as a carrier based on the RSSI output, and to have a second cutoff frequency higher than the first cutoff frequency in a second mode where the received signal is regarded as a carrier based on the RSSI output and the demodulator is activated to demodulate the received signal.

9. The interference suppression method claimed in claim 7, wherein, at the received signal strength indicator, the electric field strength is detected for a preamble of a packet signal within the received signal, and wherein, at the carrier sense judgment device, the carrier sense judgment is based on a detected strength of the preamble as indicated by the RSSI output.

10. The interference suppression method claimed in claim 7,
wherein, at the received signal strength indicator, the electric field strength is detected for a preamble of a packet signal within the received signal,
wherein, at the carrier sense judgment device, the carrier sense judgment is based on a detected strength of the preamble as indicated by the RSSI output,
wherein the bandpass filter, in a first mode having the narrowband characteristic, is configured with a passband that is narrower than a one-channel modulation occupied bandwidth, and
wherein the bandpass filter, in a second mode having the wideband characteristic, is configured with a passband equal to or wider than the one-channel modulation occupied bandwidth.

11. An interference suppression method for a direct conversion receiver in a packet radio communication system using the carrier sense multiple access method, comprising the steps of: filtering a received signal through a bandpass filter configured with a narrowband characteristic to produce a narrowband filtered signal, the received signal having undergone frequency conversion from radio to a baseband frequency; receiving, at a received signal strength indicator, the narrowband filtered signal, the received signal strength indicator generating an RSSI output that indicates an electric field strength of the narrowband filtered signal; and at a carrier sense judgment device, receiving the RSSI output and generating a carrier sense judgment based on a detected strength of the narrowband filtered signal as indicated by the RSSI output, and in the case where the received signal is regarded as a carrier, based on the carrier sense judgment, causing a demodulator to demodulate the received signal whose frequency has been converted to the baseband frequency and filtered by the bandpass filter reconfigured with a wideband characteristic, wherein the wideband characteristic is wider than the narrowband characteristic; wherein the bandpass filter, in a first mode having the narrowband characteristic, is configured with a passband that is narrower than a one-channel modulation occupied bandwidth and the bandpass filter, in a second mode having the wideband characteristic, is configured with a passband equal to or wider than the one-channel modulation occupied bandwidth.

12. The interference suppression method claimed in claim 11,
wherein the frequency conversion of the received signal is caused by amplifying the received signal with a low noise amplifier as an amplified signal, whereupon the amplified signal is input, with output from a local oscillator, to two mixers, and wherein the bandpass filter comprises two variable low-pass filters, each respectively connected to one of the mixers,
each of the variable low-pass filters configured to output both to the received signal strength indicator for carrier sensing a preamble of a received packet signal and to the demodulator, and
each of said variable low-pass filters controlled, by the carrier sense judgment device, to have a first cutoff frequency in a first mode where the received signal is not regarded as a carrier based on the RSSI output, and to have a second cutoff frequency higher than the first cutoff frequency in a second mode where the received signal is regarded as a carrier based on the RSSI output and the demodulator is activated to demodulate the received signal.

13. An interference suppression method for a superheterodyne receiver in a packet radio communication system using the carrier sense multiple access method, comprising the steps of: filtering a received signal through two bandpass filters each configured with a narrowband characteristic to produce a narrowband filtered signal, the received signal having undergone frequency conversion from radio to intermediate frequency; receiving, at a received signal strength indicator, the narrowband filtered signal from both bandpass filters, the received signal strength indicator generating an RSSI output that indicates an electric field strength of the narrowband filtered signal; and at a carrier sense judgment device, receiving the RSSI output and generating a carrier sense judgment based on a detected strength of the narrowband filtered signal as indicated by the RSSI output, and in the case where the received signal is regarded as a carrier, based on the carrier sense judgment, causing a demodulator to demodulate the received signal whose frequency has been converted to the intermediate frequency and filtered by the two bandpass filters reconfigured by the carrier sense judgment device to have a wideband characteristic, wherein the wideband characteristic is wider than the narrowband characteristic; wherein the two bandpass filters, in a first mode having the narrowband characteristic, are configured with a passband that is narrower than a one-channel modulation occupied bandwidth and the two bandpass filters, in a second mode having the wideband characteristic, are configured with a passband equal to or wider than the one-channel modulation occupied bandwidth.

14. The interference suppression method claimed in claim 13,
wherein the frequency conversion of the received signal is caused by amplifying the received signal with a low noise amplifier as an amplified signal, whereupon the amplified signal is input, with output from a local oscillator, to two mixers, and
wherein the two bandpass filters are variable low-pass filters, each respectively connected to one of the mixers,
each of the variable low-pass filters configured to output both to the received signal strength indicator for carrier sensing a preamble of a received packet signal and to the demodulator, and
each of said variable low-pass filters controlled, by the carrier sense judgment device, to have a first cutoff frequency in a first mode where the received signal is not regarded as a carrier based on the RSSI output, and to have a second cutoff frequency higher than the first cutoff frequency in a second mode where the received signal is regarded as a carrier based on the RSSI output and the demodulator is activated to demodulate the received signal.

15. An interference suppression method for a superheterodyne receiver in a packet radio communication system using the carrier sense multiple access method, comprising the steps of: filtering a received signal through two bandpass filters each configured with a narrowband characteristic to produce a narrowband filtered signal, the received signal having undergone frequency conversion from radio to baseband frequency; receiving, at a received signal strength indicator, the narrowband filtered signal from both bandpass filters, the received signal strength indicator generating an RSSI output that indicates an electric field strength of the narrowband filtered signal; and at a carrier sense judgment device, receiving the RSSI output and generating a carrier sense judgment based on a detected strength of the narrowband filtered signal as indicated by the RSSI output, and in the case where the received signal is regarded as a carrier, based on the carrier sense judgment, causing a demodulator to demodulate the received signal whose frequency has been converted to the baseband frequency and filtered by the two bandpass filters reconfigured by the carrier sense judgment device to have a wideband characteristic, wherein the wideband characteristic is wider than the narrowband characteristic; wherein the two bandpass filters, in a first mode having the narrowband characteristic, are configured with a passband that is narrower than a one-channel modulation occupied bandwidth and the two bandpass filters, in a second mode having the wideband characteristic, are configured with a passband equal to or wider than the one-channel modulation occupied bandwidth.

16. The interference suppression method claimed in claim 15, wherein,
the bandpass filters, in a first mode having the narrowband characteristic, are configured with a passband narrower than one half-channel modulation occupied bandwidth, and
the bandpass filters, in a second mode having the wideband characteristic, are configured with a passband equal to or wider than the one half-channel modulation occupied band width.

17. The interference suppression method claimed in claim 15,
wherein the frequency conversion of the received signal is caused by amplifying the received signal with a low noise amplifier as an amplified signal, whereupon the amplified signal is input, with output from a local oscillator, to two mixers, and
wherein the two bandpass filters are variable low-pass filters, each respectively connected to one of the mixers,
each of the variable low-pass filters configured to output both to the received signal strength indicator for carrier sensing a preamble of a received packet signal and to the demodulator, and
each of said variable low-pass filters controlled, by the carrier sense judgment device, to have a first cutoff frequency in a first mode where the received signal is not regarded as a carrier based on the RSSI output, and to have a second cutoff frequency higher than the first cutoff frequency in a second mode where the received signal is regarded as a carrier based on the RSSI output and the demodulator is activated to demodulate the received signal.

18. An interference suppression method for a direct conversion receiver in a packet radio communication system using the carrier sense multiple access method, comprising the steps of: filtering a received signal through two bandpass filters each configured with a narrowband characteristic to produce a narrowband filtered signal, the received signal having undergone frequency conversion from radio to baseband frequency; receiving, at a received signal strength indicator, the narrowband filtered signal from both bandpass filters, the received signal strength indicator generating an RSSI output that indicates an electric field strength of the narrowband filtered signal; and at a carrier sense judgment device, receiving the RSSI output and generating a carrier sense judgment based on a detected strength of the narrowband filtered signal as indicated by the RSSI output, and in the case where the received signal is regarded as a carrier, based on the carrier sense judgment, causing a demodulator to demodulate the received signal whose frequency has been converted to the baseband frequency and filtered by the two bandpass filters reconfigured by the carrier sense judgment device to have a wideband characteristic, wherein the wideband characteristic is wider than the narrowband characteristic; wherein the two bandpass filters, in a first mode having the narrowband characteristic, are configured with a passband that is narrower than a one-channel modulation occupied bandwidth and the two bandpass filters, in a second mode having the wideband characteristic, are configured with a passband equal to or wider than the one-channel modulation occupied bandwidth.

19. The interference suppression method claimed in claim 18,
wherein the frequency conversion of the received signal is caused by amplifying the received signal with a low noise amplifier as an amplified signal, whereupon the amplified signal is input, with output from a local oscillator, to two mixers, and
wherein the two bandpass filters are variable low-pass filters, each respectively connected to one of the mixers,
each of the variable low-pass filters configured to output both to the received signal strength indicator for carrier sensing a preamble of a received packet signal and to the demodulator, and
each of said variable low-pass filters controlled, by the carrier sense judgment device, to have a first cutoff frequency in a first mode where the received signal is not regarded as a carrier based on the RSSI output, and to have a second cutoff frequency higher than the first cutoff frequency in a second mode where the received signal is regarded as a carrier based on the RSSI output and the demodulator is activated to demodulate the received signal.

* * * * *